July 16, 1963 A. L. FREEDMAN 3,098,222

ELECTRICAL TRANSLATORS

Filed July 11, 1958

INVENTOR
ARYE L. FREEDMAN
BY
Paul M. Craig, Jr
ATTORNEY

United States Patent Office 3,098,222
Patented July 16, 1963

3,098,222

ELECTRICAL TRANSLATORS

Arye L. Freedman, Stevenage, England, assignor to Ericsson Telephones Limited, London, England, a British company Filed July 11, 1958, Ser. No. 747,837
Claims priority, application Great Britain July 23, 1957
9 Claims. (Cl. 340—347)

Figures 1, 2:
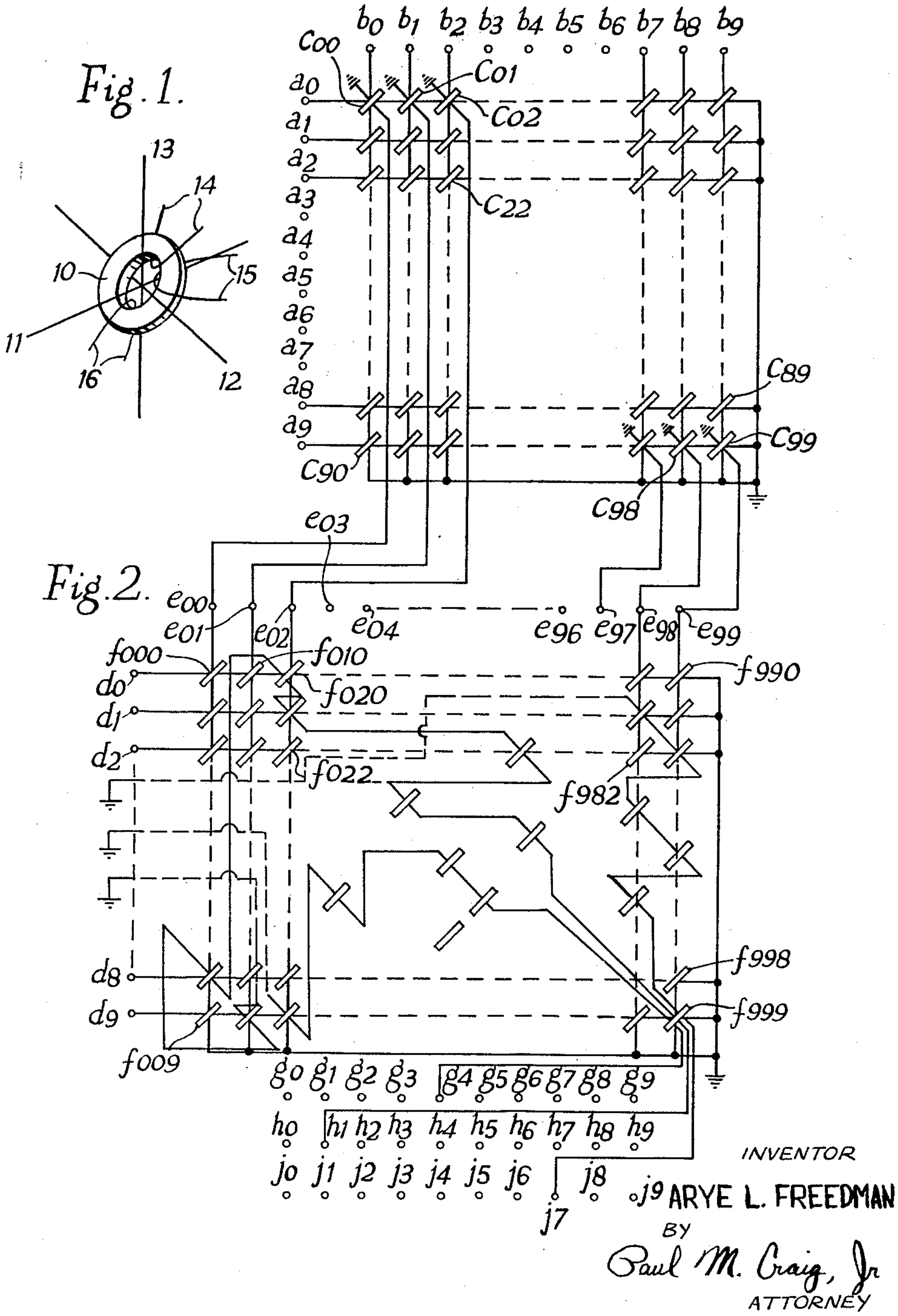

This invention relates to electrical transistors.

In an art such as that of automatic telephone switching there is sometimes need for electrical translators which can translate a number in one code into another number in the same code or a number in a different code, different coded numbers being represented by the presence of signals in different combinations of wires in a plurality of wires. Thus a translator comprises a plurality of input circuits and a plurality of output circuits and means adapted to provide signals in predetermined combinations of output circuits in response to the application of signals to predetermined combinations of input circuits.

The present invention is concerned with the type of electrical translator wherein the plurality of input circuits is constituted by a plurality of groups of input circuits and wherein each combination of input circuits to which an input signal is applied is constituted by one circuit from each group.

Translators have in the past been made using networks of diodes. In recent years, however, switchable magnetic cores have been used instead of diodes on account of their longer life and because simplification of design can be achieved.

In this specification and the claims herein, the term switchable magnetic core means a member of ferromagnetic material having a hysteresis loop of such shape that, on the application and removal of a magnetic field of appropriate sense to change the state of magnetisation of the material from one to the other of the two stable states existing in zero external field after saturation of the core in two opposite senses respectively, as the magnitude of the field of the appropriate sense is increased from zero to a first value the flux within the material changes by a relatively small amount, and as the magnitude of the field is increased beyond the first value by a value small compared with the first value a relatively large flux change, accompanied by change of sign, occurs and as the magnitude of the field is thereafter decreased to zero only a relatively small flux change occurs.

Materials having hysteresis loops of the shape known as rectangular are suitable materials. A rectangular hysteresis loop may be said to be one for which the remanent magnetic flux in the A state and the B state is 80% or more of the flux at saturation. The above definition is not however limited to cores of such materials.

The cores may conveniently be in annular form and a winding may then consist of a wire threading the annulus. Series-connected windings associated with different cores may consist of a wire threading the different cores.

Advantage is frequently taken of the properties of switchable magnetic cores to effect an "and gate" action by associating $n$ input windings with a core and arranging the amplitude of input currents in these windings to be such that when an input is present in all $n$ windings the sense of magnetisation of the core is changed, but when an input is present in only $n-1$ or less windings the sense of magnetisation of the core is not changed.

Thus in a translator of the type referred to where there are $n$ groups of input circuits a core may be provided with $n$ input windings connected respectively in the $n$ circuits of one of the combinations of input circuits. The core is provided with one or more output windings and an output pulse is induced in that winding or windings when the core changes state. Relatively small output pulses will, however, always be induced in the winding when a change occurs in the current flowing in an input winding as a hysteresis loop is never a true rectangle with its sides parallel to the B and H axes. A core may be said to possess a large "switching effect" (when it switches from one sense of magnetisation to the other) and a small "transformer effect."

A difficulty may arise in practice with a large translator owing to the occurrence of spurious output signals induced by the "transformer effect" of cores. Thus, for example, in a translator there may sometimes be a number of cores having input windings connected in series and output windings connected in series. When these input windings are energised a spurious output pulse may occur in the output windings which is of such magnitude (owing to the added "transformer effects" of the cores) that it equals or approaches in magnitude the pulse obtained when a core changes state, even though none of the said cores is intended to or does change state.

The present invention seeks to reduce the magnitude of such spurious output pulses in translators of the type referred to wherein the plurality of groups of input circuits comprises at least three groups of input circuits.

According to the present invention there is provided an electrical translator of the type referred to comprising three groups of input circuits, and two arrays of switchable magnetic cores, the cores of the first array having associated input windings connected in the circuits of the first and second groups of input circuits and associated output windings connected to input circuits comprising input windings associated with the cores of the second array, which cores are provided with further associated input windings connected in the circuits of the third group of input circuits, and with associated output windings, the arrangement of the windings being such that, in use, with operating means connected to the three groups of input circuits, on the application by the operating means of a signal to each circuit of a predetermined combination of input circuits comprising one circuit from each of the three groups, the state of magnetisation of one core of the first array changes in response to the signals applied to the input circuits of the first and second groups of input circuits, whereby an output pulse is induced in an output winding associated with the said core, the state of magnetisation of one core of the second array changing in response to the said output pulse and the signal applied to the input circuit of the third group of input circuits, whereby an output pulse is induced in the output winding or windings associated with the said core of the second array.

The manner in which the invention enables the magnitude of spurious output pulses to be reduced will be made plain in the following detailed description which also explains an advantageous way of operating translators according to the invention.

Thus the invention will now be described, by way of example, with reference to the accompanying drawings, in which:

FIG. 1 is a diagram of a core with associated windings used in describing a translator of known type, and FIG. 2 is a diagram of one embodiment of the invention.

Considering the translator of known type, this comprises one thousand magnetic cores, each having a first, second and third associated input winding. One such core 10 is shown in FIG. 1, with first, second and third input windings 11, 12 and 13 respectively. The thousand first input windings are connected together in groups of one hundred in series to form ten input circuits, each connected between one of ten input terminals respectively constituting a first group of input terminals, and earth. The second input windings are similarly arranged in ten groups of one hundred connected between a second group of ten input terminals and earth and the third input windings are similarly arranged in ten groups of one hundred connected between a third group of ten input terminals and earth.

Each core is further provided with three output windings and these are connected in groups between three groups of ten output terminals and earth in a similar manner, though in a different arrangement to that of the input windings. Thus in FIG. 1 the core 10 has three output windings, 14, 15 and 16.

If now the terminals of each group of terminals are numbered 0 to 9, an input number $xyz$ may be represented by the application of pulses to the $x$th terminal of the first input group, the $y$th terminal of the second input group and the $z$th terminal of the third input group. Only one core of the thousand will then have all its input windings energized and the magnitudes and senses of the input pulses are so arranged that this one core has its state of magnetisation changed. Its switching effect is then to induce pulses in its three associated output windings, which appear at, say, the $u$th terminal of the first output group, the $y$th terminal of the second output group and the $w$th terminal of the third output group. Thus the number $xyz$ has been translated into the number $uvw$.

In this translator, spurious output pulses are liable to occur. For instance, if a pulse induced in an output winding by the "transformer effect" of a core has an amplitude one twentieth of the amplitude of a pulse induced by the "switching effect" it only needs twenty input windings on twenty cores to be connected in series and twenty output windings on the same cores to be connected in series for a suprious output pulse of amplitude equal to that of a true output pulse to occur. Since input and output windings are connected together in series in groups of one hundred such a state of affairs is quite likely to occur.

In the diagram of the embodiment of the present invention, (FIG. 2) only a representative number of cores and windings have been shown for clarity. Furthermore the windings on the cores have not been given reference numerals, series connected windings being represented by lines passing through the cores between the various terminals and earth. The cores are represented by small diagonally placed rectangles.

The translator comprises a first array of one hundred magnetic cores $c_{00}$ to $c_{99}$ and a second array of one thousand magnetic cores $f_{000}$ to $f_{999}$. Each core of the first array has a first and second associated input winding, and one associated output winding. The one hundred first input windings are connected together in groups of ten in series to form ten input circuits, each connected between one of ten input terminals, $a_0$ to $a_9$ resectively, constituting a first group of input terminals, and earth.

The second input windings are similarly arranged in ten groups of ten, connected between a second group of ten input terminals $b_0$ to $b_9$ and earth. The output windings of the cores $c_{00}$ to $c_{99}$ are connected between earth and one hundred terminals $e_{00}$ to $e_{99}$ respectively.

Each core of the second array has a first and a second associated input winding and three associated output windings. These output windings are connected in groups of one hundred in series between three groups of ten output terminals, $g_0$ to $g_9$, $h_0$ to $h_9$ and $j_0$ to $j_9$, and earth like the output windings of the said first translator. The first input windings of the cores of the second array are connected together in groups of ten in series to form one hundred input circuits connected between the one hundred terminals $e_{00}$ to $e_{99}$ respectively and earth. The second input windings of the cores of the second array are connected together in groups of one hundred in series to form ten input circuits, each connected between one of ten input terminals $d_0$ to $d_9$ respectively, constituting a third group of input terminals, and earth.

In operation pulses are applied to one terminal of each of the three groups of input terminals, say to the terminals $a_x$, $b_y$ and $d_z$. Those applied to terminals of the first and second input groups are of such amplitude and sign that only that core of the first array which has both its input windings energised changes state. This core is the core $c_{xy}$. The "switching effect" of the core $c_{xy}$ induces a pulse in its output winding which pulse is applied to the terminals $e_{xy}$. Thus one core of the second array has both its input windings energised, the first by the output pulse from the first array and the second by the input to the terminal of the third group. This core is the core $f_{xyz}$. The turns of the output windings of the cores of the first array and the amplitude and sign of the pulse applied to the terminal of the third input group are made such that this one core $f_{xyz}$ changes its state of magnetisation. Thereupon as in the first described translator output pulses are provided at one terminal of each of the three groups of output terminals.

Only the output windings of the core $f_{999}$ have been shown, one end of the three windings respectively being connected to the terminals $g_4$, $h_1$ and $j_7$. Thus in this embodiment the number 999 is translated into 417. The other ends of the three output windings are connected to earth through, in each case, ninety-nine other series-connected output windings associated with different cores.

Short input pulses may be applied simultaneously to three terminals $a_x$, $b_y$ and $d_z$. Advantageously, however, the pulse applied to the input terminal $d_z$ is made of longer duration than those applied to the terminals of the other groups, which pulses are applied during the said longer pulse, but after the transformer effect induced by the longer has decayed. It will be appreciated that since the input circuits connected to the output windings of the first array through the terminals $e_{00}$ to $e_{99}$ each only comprise ten windings it is not possible for a spurious pulse of amplitude more than half that of a true pulse to occur if the amplitude of an individual "transformer effect" pulse is one twentieth that of a true pulse. Thus in this embodiment, under the conditions given, it is possible to differentiate unambiguously between a true pulse and a spurious pulse.

In the illustrated embodiment of the invention, each of the groups of input terminals contains the same number N of terminals connected to corresponding input circuits. N has been described as having a value 10 and the invention finds particular application where N is of this order of magnitude and the first array of cores $c_{00}$–$c_{99}$ is a square matrix of $N^2$ or 100 cores whereas the second array of cores $f_{000}$–$f_{999}$ has a rectangular configuration of $N \times N^2$ and contains $N^3$ or 1000 cores. Each of the $N^3$ cores of the second array has three output windings connected in respective output circuits leading to three of the output terminals, one of the output terminals for each core being selected from each of the three groups of output terminals so that there will be a unique combination of output terminals energized by the switching of each individual core of the second array.

The invention may be extended to translators having more than three groups of input terminals. For instance a translator having four groups of input terminals may comprise a translator such as that described as an embodiment of the invention and a third array of cores, each with two input windings connected in series with input windings of other cores of the array, one winding being energised by an output pulse from the second array and the other by a pulse applied to a fourth group of input terminals.

In all such translators it is necessary to reset cores to an initial state after the application of input pulses. Any convenient means such as a reset winding on each core may be used to effect this.

It will be appreciated that the arrangement of output windings on the final array of cores can be arranged in any way appropriate to effect a required translation. For instance in the embodiment described the output windings may be arranged in such a way that the translator translates the numbers 000 to 999 into the corresponding numbers in the binary code.

It will furthermore be appreciated that in embodiments of the invention all the cores may be provided with inhibit windings which are energized by the operating circuit, either continuously or simultaneously with the application of signals to the input circuits, to bias the cores against the effect of the input signals. In these circumstances it is arranged that the inhibit winding on a core substantially cancels the effect of one energized input winding on the core, the effect of the second winding on the core, when energized, being sufficient to change the state of magnetisation of the core.

If inhibit windings are provided they may also be employed to reset the cores to a datum state after each translating operation. If the inhibit windings are energized continuously resetting occurs automatically.

I claim:

1. An electrical translator including two arrays of switchable magnetic cores having two stable remanent states, each array providing effectively a plurality of rows and columns of series connected input circuits including three groups of input circuits and a further group of input circuits comprising input windings, the cores of the first array having associated therewith input windings of the first and second groups of input circuits and the cores of the second array having associated therewith input windings of the third group, said translator further comprising intermediate output windings associated with the cores of said first array, intermediate input windings associated with the cores of said second array, said intermediate input circuits forming the further group of input circuits and operatively connecting said intermediate input windings with said intermediate output windings, means including said input circuits and operatively interconnecting said input and output windings in respective circuits and interrelating said circuits with said cores to provide, on the application of operating pulses through a combination of input circuits comprising one circuit from each of said groups, a change of the state of magnetization of one of said cores of said first array in response to the operating pulses applied to the input circuits in said first and second groups and a change of the state of magnetization of one of said cores of said second array in response to the operating pulse applied to the input circuit of said third group and the pulse supplied by said one core in said first array through the intermediate output winding associated therewith to the intermediate input winding connected thereto, said one core in said second array being a different core for each said combination of three input circuits, output circuits associated with the cores of said second array with each output circuit comprising a plurality of output windings connected in series and associated with a different combination of cores of said second array selected from said rows and columns to provide the desired translating effect, each core of said second array having associated therewith a plurality of said output windings in different output circuits, said second array including means for operatively interrelating each output circuit with certain cores of said second array to provide energization of a unique combination of output circuits in response to the change of state of each individual core of said second array.

2. A translator according to claim 1, comprising a third array of cores, a fourth group of input circuits comprising input windings associated with the cores of said third array, further intermediate input windings associated with the cores of said third array and connected to said output windings associated with said cores of said second array and further output windings associated with said cores of said third array, whereby on the application of operating pulses to different predetermined combinations of input circuits comprising one circuit from each of said four groups, the state of magnetisation of different ones of said cores of said third array changes.

3. A translator according to claim 1, wherein inhibit windings are provided on all said cores for energisation simultaneously with the application of said operating pulses.

4. A translator according to claim 1, wherein reset windings are provided on all said cores for resetting said cores to an initial state.

5. A translator according to claim 1, wherein said cores are annular in form.

6. A translator according to claim 1, wherein said second array has of the order of 1000 cores.

7. An electrical translator comprising first, second and third groups of input circuits, each group containing substantially the same number of circuits, a first array of switchable magnetic cores effectively providing two stable remanent states and having associated therewith input windings of said first and second groups, and a second markedly non-square array of switchable magnetic cores effectively providing two stable remanent states and having associated therewith input windings of said third group, intermediate output windings associated with the cores respectively of said first array, intermediate input windings associated with the cores of said second array and connected to said intermediate output windings, and output circuits, said arrays effectively providing rows and columns by the series connection, in the input circuits thereof of, a plurality of the input windings, means operatively interconnecting said input and output windings in respective circuits and interrelating said circuits with said cores to provide, on the application of operating pulses through a combination of input circuits comprising one circuit from each of said groups, a change of the state of magnetization of one of said cores of said first array in response to the operating pulses applied to the input circuits in said first and second groups and a change of the state of magnetization of one of said cores of said second array in response to the operating pulse applied to the input circuit of said third group and the pulse supplied by said one core in said first array through the intermediate output winding associated therewith to the intermediate input winding connected thereto, said one core in said second array being a different core for each said combination of three input circuits, output circuits associated with the cores of said second array with each output circuit comprising a plurality of output windings connected in series and associated with a different combination of cores of said second array selected from said rows and columns to provide the desired translating effect, each core of said second array having associated therewith a plurality of said output windings in different output circuits, said second array including means for operatively interrelating each output circuit with certain cores of said second array to provide energization of a unique combination of output circuits in response to the change of state of each individual core of said second array.

8. A translator according to claim 7, wherein each said group contains the same number N of input circuits, said first array contains $N^2$ cores and wherein said second array is a $N \times N^2$ array containing $N^3$ cores.

9. A translator according to claim 8, wherein N is 10.

References Cited in the file of this patent

UNITED STATES PATENTS

| | | |
|---|---|---|
| 2,691,155 | Rosenberg | Oct. 5, 1954 |
| 2,734,187 | Rajchman | Feb. 7, 1956 |
| 2,740,949 | Counihan et al. | Apr. 3, 1956 |
| 2,776,419 | Rajchman | Jan. 1, 1957 |
| 2,856,596 | Miller | Oct. 14, 1958 |
| 2,895,124 | Harris | July 14, 1959 |

FOREIGN PATENTS

| | | |
|---|---|---|
| 769,384 | Great Britain | Mar. 6, 1957 |